(12) United States Patent
Schmidt et al.

(10) Patent No.: US 8,191,081 B2
(45) Date of Patent: May 29, 2012

(54) CONDITION-BASED EVENT FILTERING

(75) Inventors: Patrick Schmidt, Heidelberg (DE); Rene Niebuhr, Wiesloch (DE)

(73) Assignee: SAP AG, Walldorf (DE)

(*) Notice: Subject to any disclaimer, the term of this patent is extended or adjusted under 35 U.S.C. 154(b) by 1136 days.

(21) Appl. No.: 11/851,365

(22) Filed: Sep. 6, 2007

(65) Prior Publication Data

US 2009/0070783 A1 Mar. 12, 2009

(51) Int. Cl.
*G06F 13/00* (2006.01)
(52) U.S. Cl. .......................................... 719/318; 719/313
(58) Field of Classification Search .................. 719/313, 719/318
See application file for complete search history.

(56) References Cited

U.S. PATENT DOCUMENTS

| | | | | |
|---|---|---|---|---|
| 5,867,659 A * | 2/1999 | Otteson | ........................ | 709/224 |
| 6,941,367 B2 * | 9/2005 | Vosseler et al. | ............... | 709/224 |
| 7,565,425 B2 * | 7/2009 | Van Vleet et al. | ............. | 709/224 |
| 7,685,605 B1 * | 3/2010 | Ahmed et al. | ................ | 719/318 |
| 2003/0126240 A1 * | 7/2003 | Vosseler | ........................ | 709/221 |
| 2005/0177616 A1 * | 8/2005 | Addington et al. | ........... | 709/203 |
| 2007/0180490 A1 * | 8/2007 | Renzi et al. | ....................... | 726/1 |
| 2008/0001710 A1 * | 1/2008 | Agarwal et al. | .............. | 340/10.1 |

* cited by examiner

*Primary Examiner* — Andy Ho
(74) *Attorney, Agent, or Firm* — Mintz Levin Cohn Ferris Glovsky and Popeo, P.C.

(57) ABSTRACT

A system and method for monitoring activity of a business application are disclosed. A system includes a condition editor provided by an integration builder tool of a message exchange infrastructure connecting an event resolution portal server and the business application. The condition editor is adapted to configure one or parameters to define one or more conditions for one or more business objects of the business application. The system further includes a filter framework adapted to detect a state change event from the one or more business objects, compare the state change with the one or more conditions to determine a relevance of the state change event, and report relevant state change events to the event resolution portal server.

20 Claims, 6 Drawing Sheets

CONDITION-BASED EVENT FILTERING

BACKGROUND

This disclosure relates generally to computer-based mechanisms for monitoring activity of a business application, and more particularly to an infrastructure for monitoring local events of a distributed business application.

Business applications, such as Customer Relationship Management (CRM) applications, Enterprise Resource Planning (ERP) applications, or Product Lifecycle Management (PRM) applications, usually lack communications necessary to be able to accurately monitor business activity within the application. One comprehensive solution is the Business Activity Monitoring (BAM) provided by SAP AG to monitor workflow events of business impact within an executing business application, and deduce actions if necessary. BAM can span both the applications of an application system landscape as well as the application orchestration layer, i.e. the integration processes.

However, if every workflow event generates at least one message via a monitoring event, the central integration server which performs the monitoring can be overloaded. Accordingly, these workflow events need to be filtered to avoid such overload. There needs to be a mechanism to fire monitoring events upon certain application-specific conditions.

SUMMARY

In general, this document discusses a technique to lessen the overall load of a business activity monitoring (BAM) server. In particular, this document discloses a BAM system that uses condition-based event filtering, where conditions generated by a condition editor are used by event filters. The event filters can be deployed at different filter locations, each filter location having different filter costs.

In one aspect, a system for monitoring activity of a business application includes a condition editor provided by an integration builder tool of a message exchange infrastructure connecting an event resolution portal server and the business application. The condition editor is adapted to configure one or parameters to define one or more conditions for one or more business objects of the business application. The system further includes a filter framework adapted to detect a state change event from the one or more business objects, compare the state change with the one or more conditions to determine a relevance of the state change event, and report relevant state change events to the event resolution portal server.

In another aspect, a system for monitoring activity of a business application includes a condition storage storing one or more conditions, each condition comprising one or more parameters and at least one operator associated with the one or more parameters. The system further includes a condition runtime engine that collects data associated with a state change event of the business application related to at least one of the one or more parameters and retrieve at least one relevant condition. The system further includes a filter framework adapted to detect the state change event from the business application, compare the state change with the at least one relevant condition, and generate an alert message if the state change complies with the at least one relevant condition.

In yet another aspect, a method of monitoring activity of a business application includes steps of gathering data from execution of the workflow of the business application, the data representing one or more workflow events, and filtering the one or more workflow events according to one or more conditions, each condition comprising one or more parameters related to the workflow event coupled with at least one operator. The method further includes, for each workflow event corresponding to a predetermined number of the one or more conditions, generating a monitoring event message for being sent to one or more monitoring processes.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
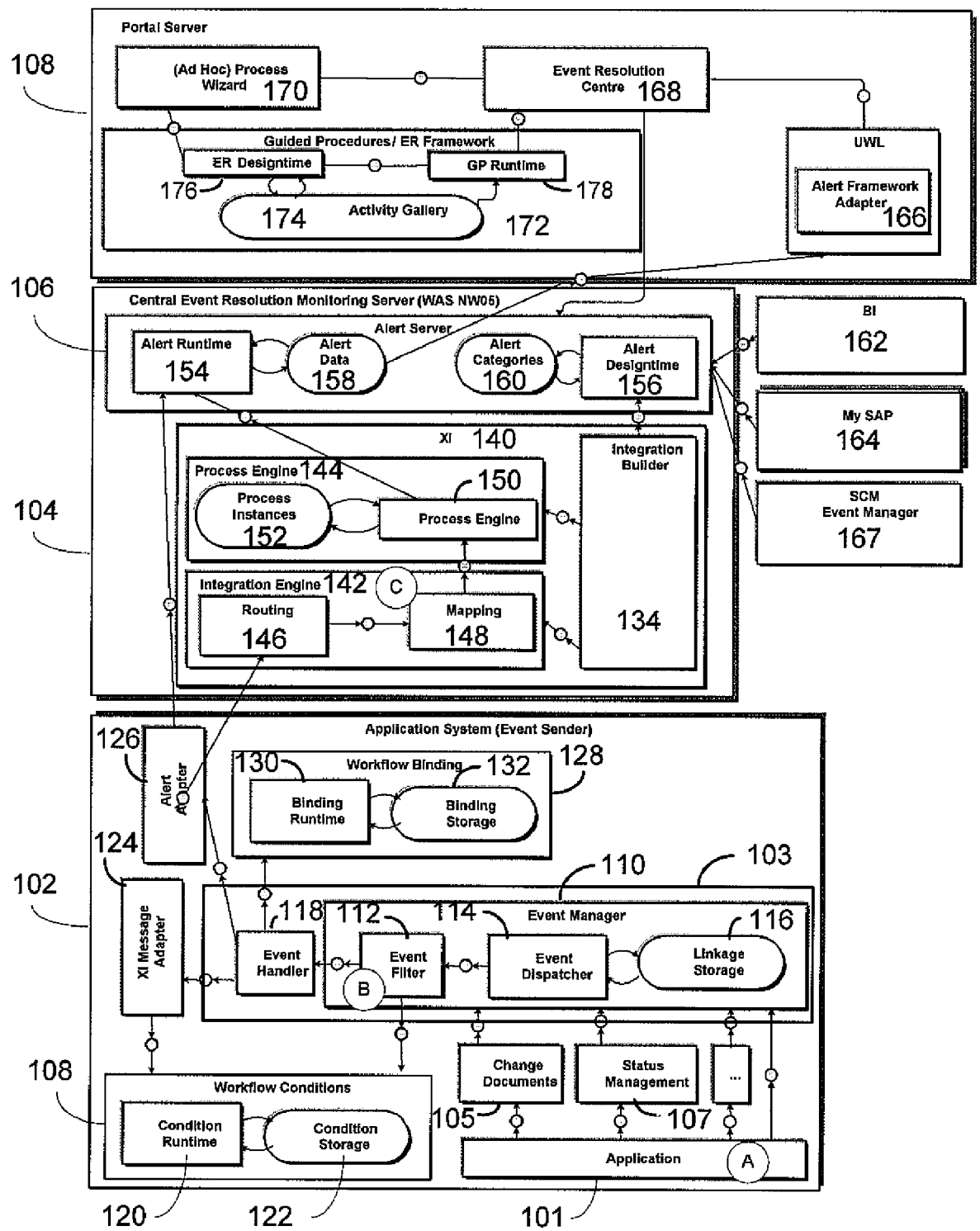
FIG. 1 is a block diagram of a business application system.

This document describes condition-based event filtering in a business activity monitoring (BAM) system of a business application. Conditions generated by a condition editor are used by event filters that can be deployed at different filter locations about the business application, and each filter location can have a different filter cost. Conditional behavior can be designed in the context of monitoring processes to describe thresholds that trigger events (e.g. a sales order exceeding a particular credit limit).

In a business application system having a BAM system, a monitoring process collects events raised by diverse sources and deduces action items to be completed by business experts. Such an expert can then design, configure and deploy such processes using an Integration Builder (IB) set of tools provided by a messaging infrastructure used by the business application, such as SAP's Exchange Infrastructure (XI).

A monitoring event is a notification by the monitoring process about a significant state change in the business application system. In SAP's XI, the transport medium of monitoring events are XI messages, and the transport mechanism is the XI messaging infrastructure. BAM enriches the scenario of event resolution with stateful processes and correlation of monitoring events.

An application can discharge monitoring events using message communication, and therefore a monitoring event also represents a message interface that refers to message type, etc. Each already existing message communication can be used to supply monitoring processes with information. Additional monitoring events are necessary when no message communication exists already.

Workflow events can be used to enable application systems to fire monitoring events to eventually produce an event resolution. Event resolution in a basic sense means that an application detects invalid business data or some deadline that has been reached in a workflow event, and an alert is dispatched. This alert will be used by an event resolution framework (Event Resolution Center, or "ERC") to generate a resolution to the workflow event. Thus, the application alone must be able to detect the inconsistent or incorrect state of the application data. In some cases, the application itself will not be able to detect such inconsistencies because it may need additional data from other systems, or because one monitoring event alone does not lead to an alert that is visible to an enduser.

In order to detect workflow events, conditions are established for each application. Process steps and parameters for the conditions are defined in an integration builder (IB) tool and executed for controlling the BAM processes. Decisions in a control flow are made based on the result of a condition. In particular, conditions determine whether an alert needs to be raised. A business process monitoring (BPM) system, by means of a condition and data of the process context, decides which branch of the control flow to follow.

The condition editor includes a UI with easy to use features, a capacity to use more operators, and can use variables in a condition. The condition editor further includes editing features such as the ability to receive user-typed conditions, and provide appropriate help during the conditions creation process, including intelligence for possible operators/operands, drag and drop condition variables, and so on. The user can undo/redo changes made during editing the condition. Functions such as cut, copy and paste of part or all of a condition string and operands can be made within the editing area.

The condition editor provides readability by highlighting the operators and matching parenthesis, and performs a syntax and semantic check at the time of condition definition. The user can see the condition with semantically erroneous expressions highlighted. The set of operators supported by the Condition Editor UI is restricted, however the "escape" character (ESC) could be used to provide comments while building conditions (E.g. "* . . . *", "/* . . . */"). This text within the escape character would provide the user the facility to document the condition in the editor itself.

The condition editor can use more operators so as to be extensible for building complex conditions, provide all the operators supported by the Business Workflow condition component:

TABLE 1

(partial list of usable operators)

| Operator | Description |
|---|---|
| CP/≈ | Pattern match (implemented by ABAP: CP) |
| NP/≈ | No pattern match (implemented by ABAP: NP) |
| < | Less than |
| <= | Less than or equal |
| > | Larger than |
| >= | Larger or equal |
| CE | Table contains value(s), lhs is a superset of rhs |
| NE | Table does not contain value, lhs is NOT a superset of rhs |
| EX | A value exists (operator requires ONE operand) |
| NX | No value exists (operator requires ONE operand) |

The condition editor also includes a capacity to use variables. Each condition can be viewed as a set of operands and operators, where each operand is a value by itself. Instead of providing absolute values (long x-paths) repeatedly in the condition, an indirection can provide variables representing the values of operands, as explained more fully below.

FIG. 1 illustrates a business application system 100 that aggregates and evaluates monitoring events detected from one or more heterogeneous business applications 101. The business application system 100 monitors the relevant business issues across the business application system 100, normalizes the issues into a standard message protocol, alerts responsible users, and supports the resolution of the business issues. A business issue can be an error in the runtime of a business application 101, an integration problem among two or more business applications 101 or systems, or other problem that affects the proper functioning of the business applications 101. The business application system 100 includes an application system 102, a central event resolution monitoring server 104 including an alert server 106, and a portal server.

Detecting business issues is performed by a local event infrastructure 103 as a part of the application system 102. The local event infrastructure 103 includes an event manager 110 to manage detection of events and mapping the events to exchange infrastructure (XI) messages. The event manager 110 includes an event dispatcher 114 that interprets linkage tables in a linkage storage 116 between events of an application 101 and an event consumer, such as a BAM system. The events are detected by the event manager from a change documents module 105, an application status management module 107, or other module that can generate a message representing a state change of an instance of an application 101 process.

The event manager 110 further includes an event filter 112 that filters events based on conditions, thresholds, parameters, etc., and checks the relevance of the events, based on workflow conditions 108. The event filter 112 then executes an event handler 118 for relevant events. The workflow conditions 108 includes a condition storage 122 that stores one or more conditions of a workflow of the application 101, and which are executed and evaluated by a condition runtime engine 120. As will be discussed below, the conditions can be established via modeling tool such as an integration builder 134.

The event handler 118 translates relevant events into a monitoring event based at least in part on a workflow binding module 128. The workflow binding module 128 includes a binding storage 132 and a binding runtime engine 130 that executes a binding function. The event handler 118 also prepares an alert for the monitoring event via an alert adapter 126.

In some implementations, events generated by heterogeneous sources are normalized to XI messages that can be selectively linked to other XI messages. Such events include workflow events created all over the system landscape.

As discussed above, the integration builder 134 is used to define the monitoring events, monitoring processes, process-relevant alert categories, mappings, etc., and to configure each monitoring process. To streamline the setup of the local event infrastructure 103, settings will be made centrally to the greatest extent possible. The integration builder 134 is part of the XI 140. The XI 140 also includes a integration engine 142 and a process engine 144. The integration engine 142 includes a routing module 146 to route XI message-configured monitoring events to the desired message recipient, i.e. the alert server 106. The integration engine 142 also includes a mapping module 148 to map monitoring events to monitoring processes. The monitoring processes are executed by a process engine 150 that is controlled by the integration builder 134, and which generates and runs process instances 152.

The alert server 106 is configured to manage and link alert categories to users. The alert server 106 includes an alert design time module 156 that generates and stores the alert categories 160. The alert server 106 further includes an alert runtime 154 that generates and stores alert data 158 based on messages received either from the process engine 150 or from the alert adapter 126 in the application system 102. Alerts needing or requiring resolution are sent in the form of alert data to an alert framework adapter for resolution in the portal server 108.

Several components can have access to or supply information to the alert server 106. The alert server 106 may be connected with a business intelligence (BI) system 162. BI is adapted to configure key performance indicators for the business application system 100. A role-based set of application tools, such as a MySAP suite of application tools 164, can be used by the alert server 106. Finally, an application-specific event manager 167 can be used to manage events as indicated by the alert server 106.

The portal server 108 provides a portal that includes an event resolution center 168, a graphical user interface in which a user can resolve issues for which alerts have been generated and for which monitoring events and monitoring processes have been created. The event resolution center 168 can be connected to a process wizard 170, which can logically, and in an ad-hoc manner, walk a user through steps to resolve or fix the issue, and can track user actions in such resolutions.

The process wizard 170 and event resolution center 168 use a guided procedures/event resolution framework 172. This framework 172 includes an activity gallery 174 of possible activities that can be undertaken by a user of the portal server. The activities in the activity gallery 174 are used by an event resolution design time module 176, which creates templates of possible resolutions to issues. The activities are also used by a guided procedure runtime module 178 which executes guided procedures for the event resolution center 168. The event resolution design time module 176 can also save new activities to the activity gallery 174 based on feedback from the process wizard 170 for dynamic, self-learning and future use.

Not all business object state changes are relevant for event resolution in the BAM system, and a decide whether or not a monitoring event needs is made. This decision is evaluated locally (in the application system, before the monitoring events is transmitted via external communication) to minimize external communication and to provide all application data as decision base for the condition that decides whether the event is event resolution relevant or not.

The event filter performs filtering using a "start condition" that runs on business objects to reduce the delivered events. Alternatively, check-functions allow stopping an event upon an application decision. Each application can create a check-function for each case or use the more generic start conditions. Start conditions are preferably only used for workflow start, but could be adapted to check all kinds of events. These conditions are maintained locally in the application system. Event coupling and condition definition should be done locally in the application system to access the object attributes and available events. In addition, some applications need customizing steps to enable firing events.

Figure 2:
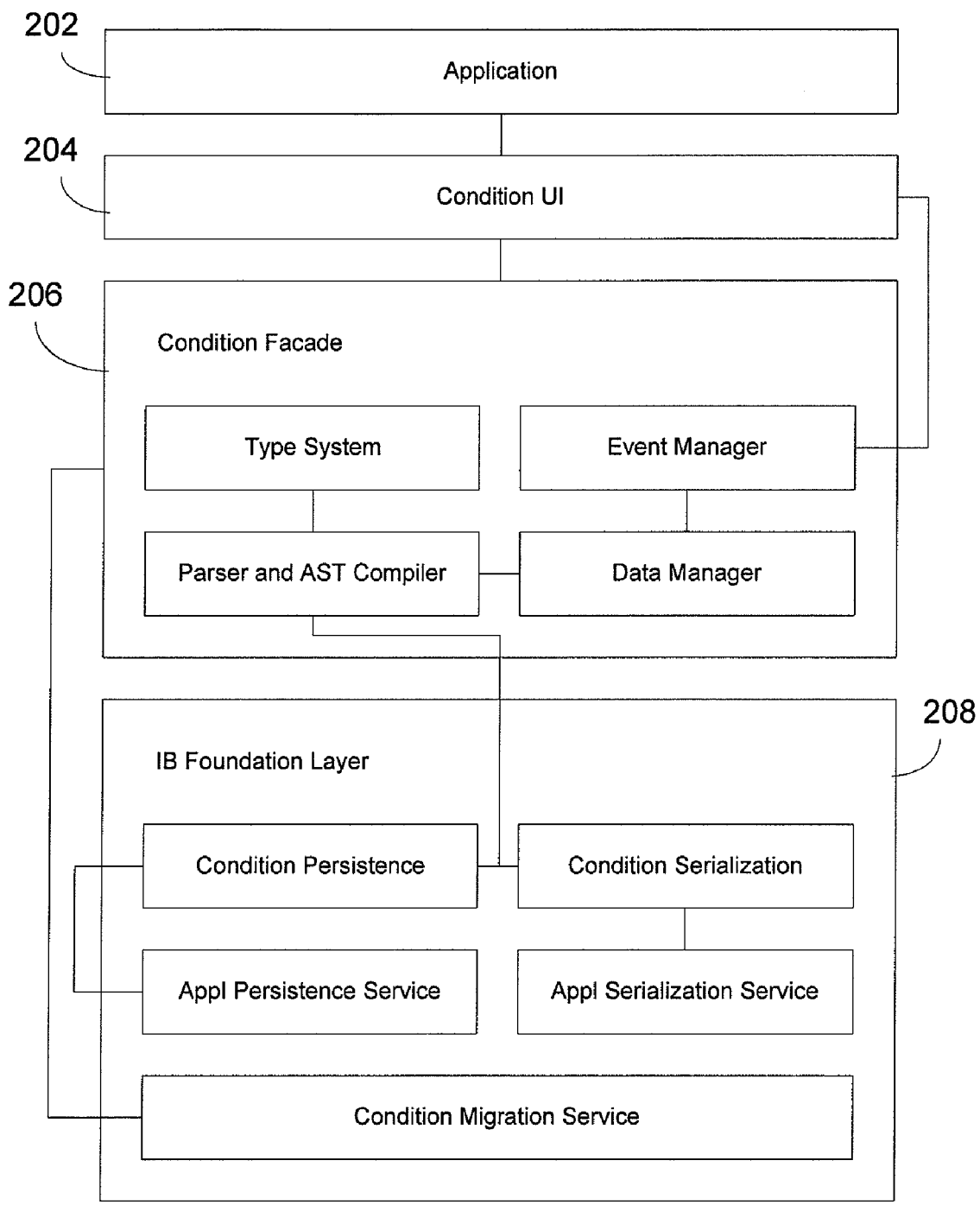
FIG. 2 depicts the subsystems and services of the condition model.

FIG. 2 depicts the subsystems and services of the condition model 200, and how they relate to one another as well as to surrounding layers. The condition model 200 includes an application layer 202, a condition UI layer 204, and a condition facade layer 206. The condition facade layer 206 provides a type system, an event manager, a parser, and a data manager. The condition model 200 further includes an integration builder (IB) foundation layer 208, providing condition persistence, condition serialization, an application persistence service, and an application serialization service. The IB foundation layer 208 also provides a condition migration service as an interface to the condition facade layer 206. The condition model 200 is used by different applications in the context of Integration Builder Repository and Directory. These applications have different requirements on how the model should function. Hence, the condition model 200 is flexible. Applications will be in a position to enable or disable features of the condition model 200 based on their requirements. This is discussed in further detail below.

Figure 3:
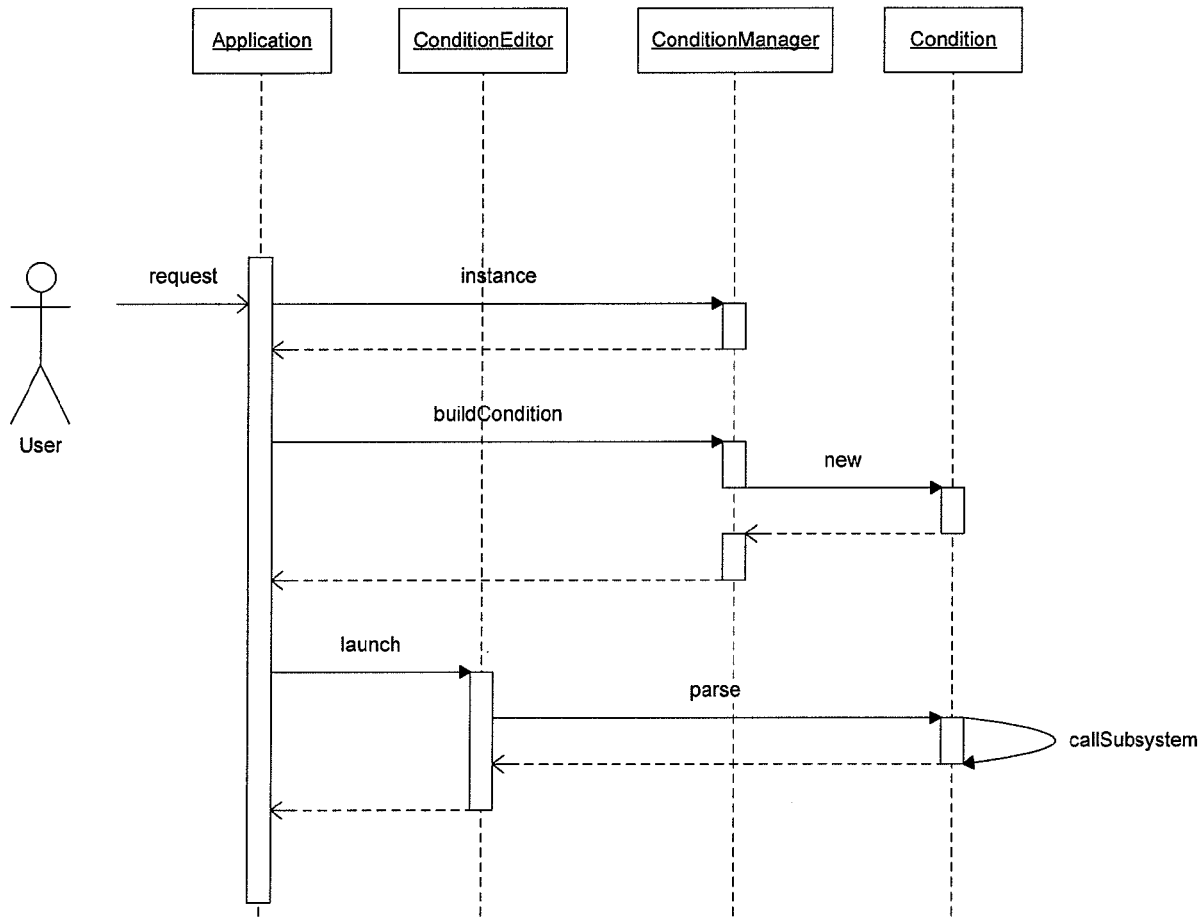
FIG. 3 illustrates a call sequence showing how a request is passed from an application to the condition model.

FIG. 3 illustrates a call sequence 300 showing how a request is passed from an application to the condition model 200. The single point of entry is the Condition Manager which can be customized to satisfy the requirements of an application. The Condition Manager incorporates grammar settings (e.g. supported operators) and extractor settings (e.g. context object types etc.).

Once configured, a ConditionManager instance can be requested to construct condition instances according to its configuration. After obtaining such an instance, the application provides the input stream to be parsed. From an application point of view, this is the finest level of granularity. The actual implementation of the condition instance behavior is not visible from the outside. The parse routine results in an abstract syntax tree represented by the ConditionSyntaxTree. Next to it, a condition instance holds variable declarations and instantiations in the form of a Container and PropertySet (discussed further below).

Figure 4:
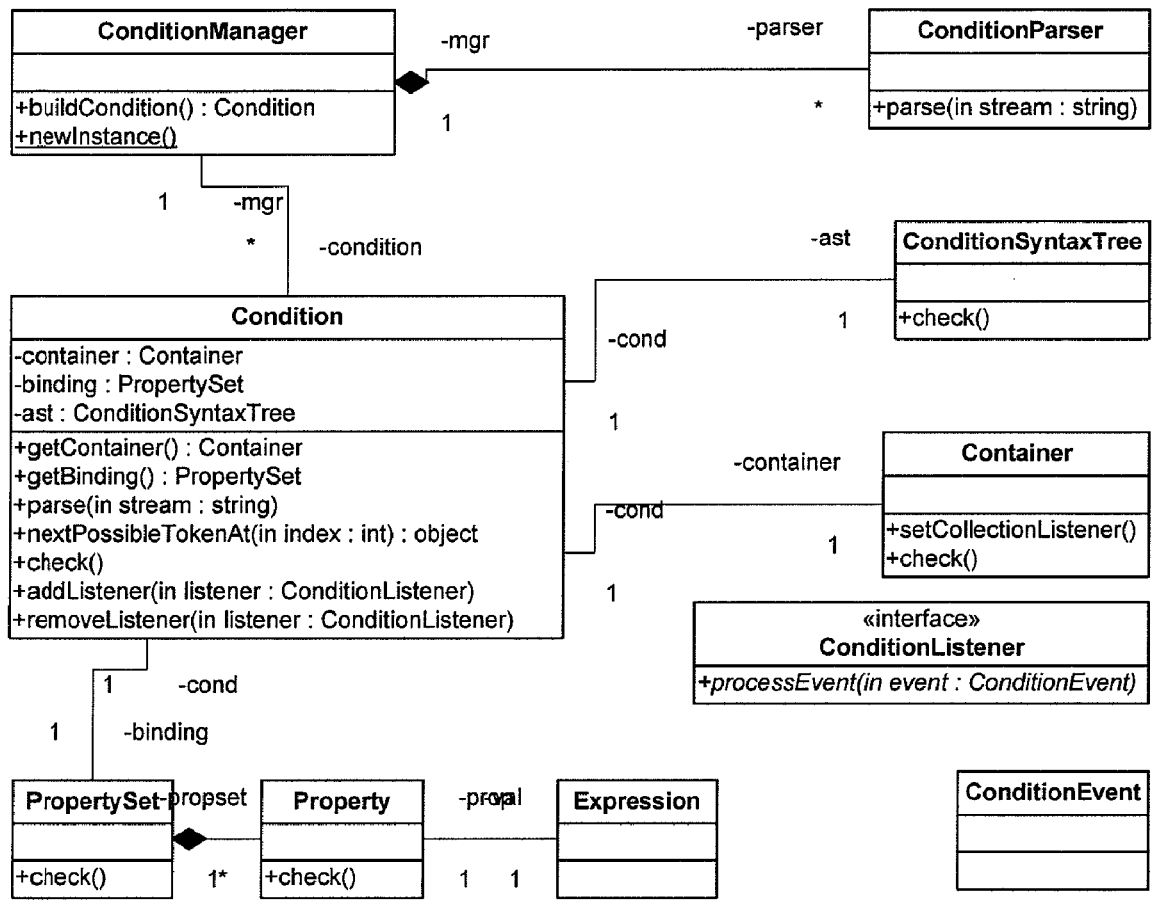
FIG. 4 illustrates condition model classes.
Figure 4:
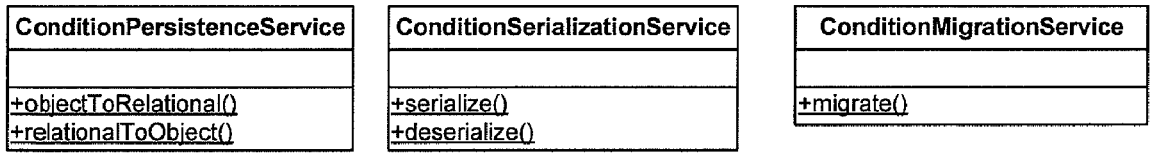

The only way for an application to manipulate the state of this instance is by either having it parse a new input stream or by setting new container elements and the respective bindings. In the event of a change, the notification mechanism is triggered to inform subscribers about the state transition. FIG. 4 illustrates condition model classes.

A formal language is a set of finite character strings. These character strings are composed from the members of a finite alphabet set, usually according to a set of rules that specifies their production. A formal grammar is a system that specifies/abstracts over such a formal language: the grammar thus differentiates between strings that belong to the formal language and those that do not. A grammar imposes a structure on the language it generates. Strings derived from the grammar are consistent according to the rules of the Grammar. The morphemes (henceforth referred to as tokens) are available to the processor, along with their relationship to each other. The structure is especially crucial to an automatic processor.

Conditions, being a language construct themselves, are subject to this formal treatment. Accordingly, a condition follows a set of rules which can be represented by the condition grammar. A parser then interprets the condition against these rules. The formal approach (and the automatisms that the formality generates) results in the following advantages:

Error detection: the input stream could be in error. Depending on the sequence on the token encountered so far and the matching production rules, the parser can anticipate the set of next possible tokens. If the scanned token is not from this set, the input string is in error as per the grammar.

Input suggestion: The set of possible tokens discussed above can also be used to suggest a valid possible next token in the input string that is encountered so far. This is of interest for UIs such as the condition editor, where the user inputs the string that represents a condition.

The workflow event mechanism already provides a mechanism to reduce the delivered events. The check-functions allow stopping an event upon application decision. Each application can create an own check-function for each case or use the more generic mechanism of so-called start conditions. Start conditions can be used for workflow start, but could be adapted to check all kinds of events. These conditions must be maintained locally in the application system as long the integration repository has no access to the business object metamodel of each application system. The business objects do not exist in the integration builder.

The event coupling and the start conditions are maintained locally in the application system, because only there are all needed repositories (e.g. BOR, Class Library, . . . ) available. That means the event coupling and the condition definition are done locally in the application system to access the object attributes and available events. In addition, some applications need customizing steps to enable firing events.

All data on which a condition is running must be gathered before the condition is executed. Thus, if a condition execution needs more data than available in the process container, the person modeling the process must call several services (using the XI messaging layer via Send and Receive steps) to get the data in the process container. The process can react upon errors during this data enrichment phase and eventually react upon these errors and propagate alert. This makes sure that the condition technology will not implement yet another workflow tool to handle exceptions during a data enrichment phase.

Figure 5:
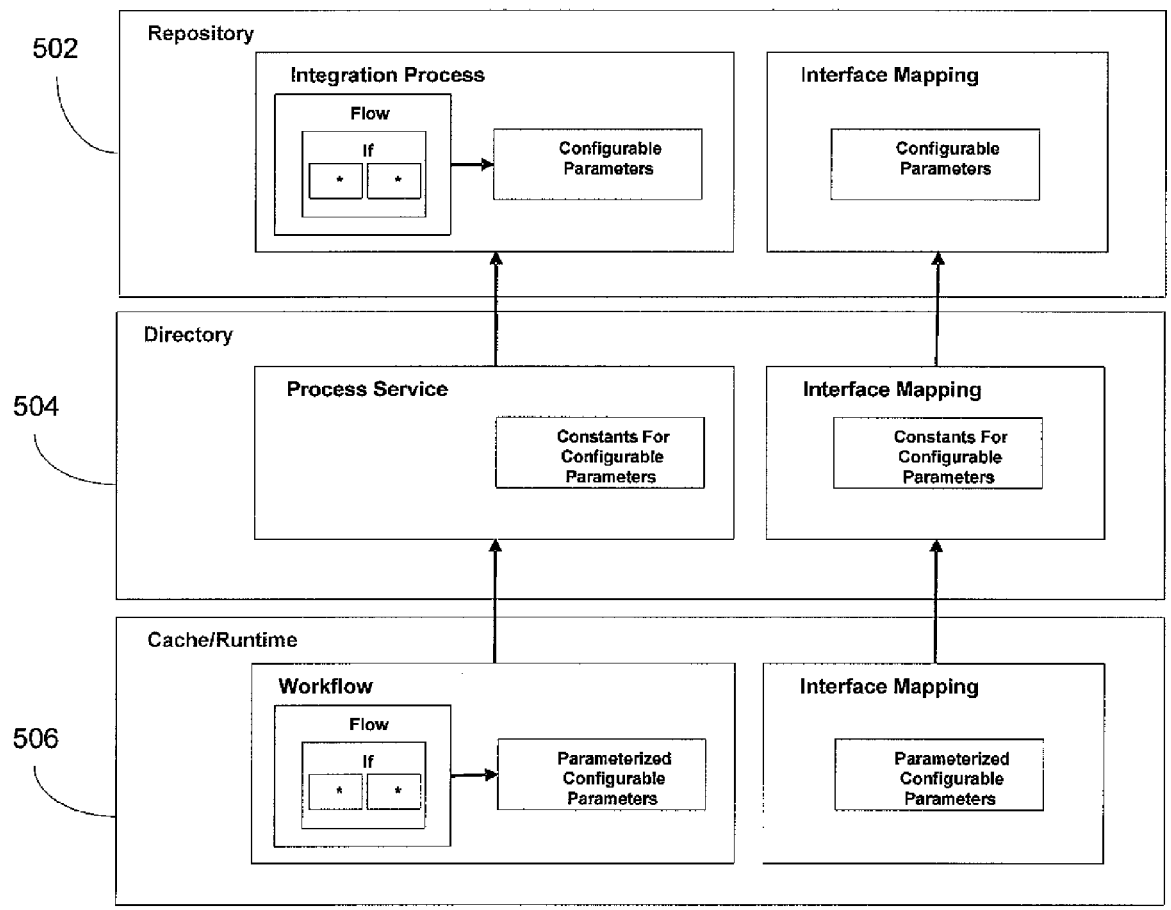
FIG. 5 is a functional flow diagram of configurable parameters for processes.

FIG. 5 is a functional flow diagram of an XI environment 500 illustrating configurable parameters for monitoring processes during monitoring process definition. A cache/runtime 506 includes a workflow and an interface mapping, each having parameterized configurable parameters. Content (agnostic of concrete business systems at customer's site) for an integration repository 502 can be delivered to customers while the content of an integration directory 504 contains links to business systems (e.g. URLs, . . . ). According to the XI architecture, the conditions only need to be configured in the integration directory 504. In the integration repository 502, conditions can be changed directly.

Referring back to FIG. 1, conditions are used in the integration processes 152 as well as in the routing 146. Routing condition definition is already located in the integration directory 504, so changes to the complete condition can take place there directly. Parameters for the conditions are defined in the integration repository 502 and configured in the integration directory 504. According to a general XI approach for parameterizable objects, the integration process will get a signature in the integration repository 502 and be configured in the integration directory 504. This approach helps the user to avoid mistakes. Exposing the parameterizable constants on the process level allows to use the parameter in several conditions and to configure it only once.

Figure 6:
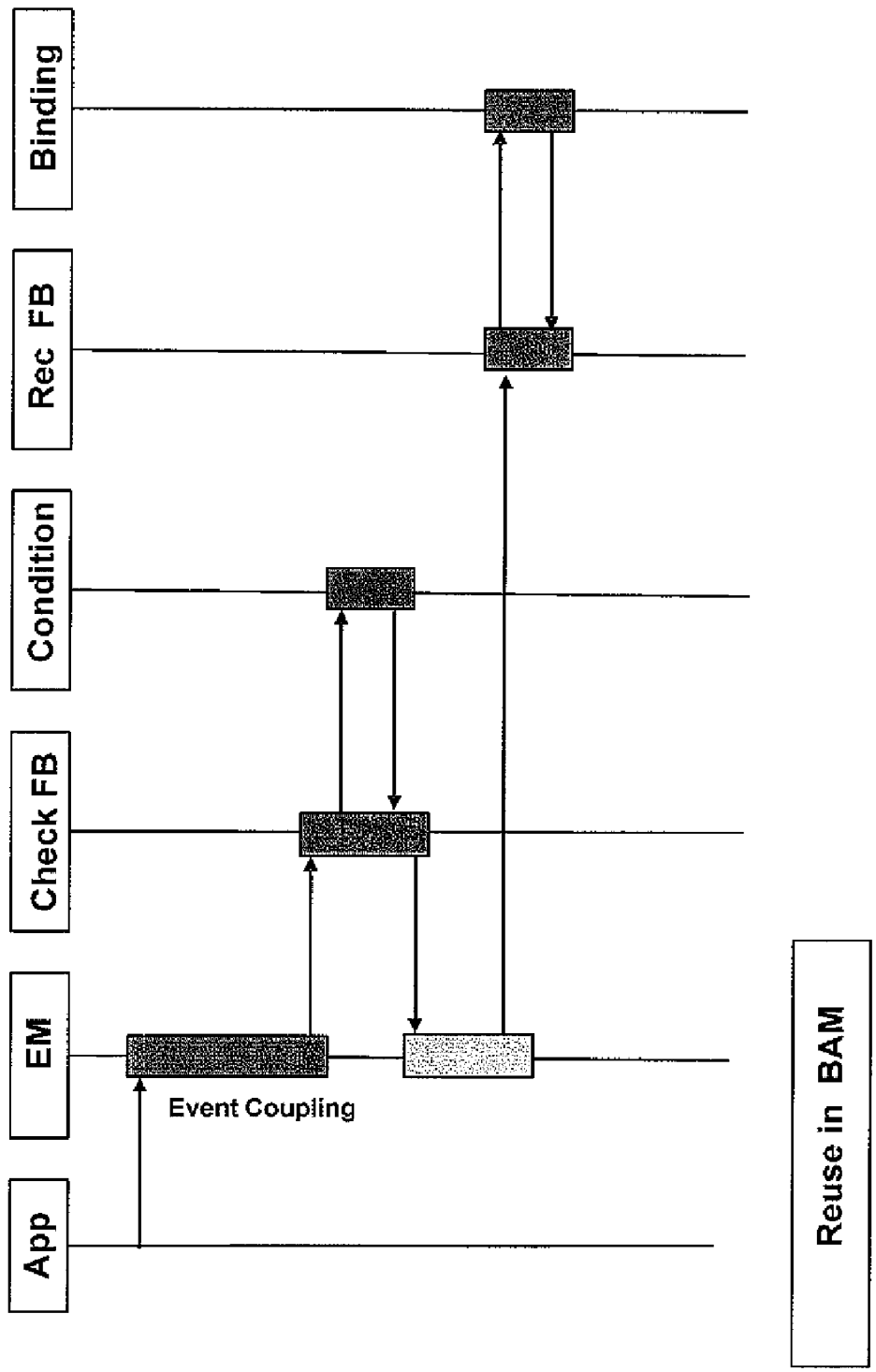
FIG. 6 shows a workflow event execution sequence of an event manager.

With reference to FIG. 6 and FIG. 1, the workflow event execution sequence is as follows: the event manager receives the event. A predefined check (function) module may check the relevance of the event (generic using workflow conditions), the receiver (function) module executes required actions after having received the event data via binding. The event manager and the other components shown are reused from the workflow infrastructure as summarized in the following table:

TABLE 2

| Reuse Component | Purpose |
| --- | --- |
| Event Coupling Table | Defines relation between Event and Proxy |
| Check (function) module | Defines generic (function) module for Filtering |
| Receiver (function) module | Defines generic (function) module for communication (proxy execution) |
| Condition | Filters Conditions |
| Binding | Supply data to from Workflow Event to Proxy |

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVDROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for monitoring activity of a distributed business application, the system comprising:

a condition editor implemented by one or more processors and provided by an integration builder tool of a message exchange infrastructure connecting an event resolution portal server and the distributed business application, the condition editor generating one or more parameters to define one or more conditions for one or more business objects of the distributed business application;

a filter framework implemented by one or more processors to detect a state change event from the one or more business objects, compare the state change with the one or more conditions to determine a relevance of the state change event, and report relevant state change events to the event resolution portal server; and an alert server implemented by one or more processors and in communication with the filter framework and the event resolution portal server, the alert server adapted to receive a message from the filter framework representing a relevant state change event, the alert server adapted to generate an alert to a user linked with an alert category characterized by the alert.

2. A system in accordance with claim 1, wherein the filter framework includes a state change detection module within the distributed business application.

3. A system in accordance with claim 1, wherein at least part of the filter framework includes an event manager having an event filter that receives a workflow event message from one or more workflow message generators in communication with the one or more business objects.

4. A system in accordance with claim 1, further comprising a set of operators stored in a condition storage for selection by the condition editor to define the one or more conditions, the one or more conditions comprising whether sales order associated with the monitoring activity exceeds a predetermined credit limit.

5. A system in accordance with claim 4, further comprising a condition runtime engine implemented by one or more processors that collects data associated with the state change event, accesses selected ones of the one or more conditions from the condition storage, and sends the selected conditions to the filter framework.

6. A system in accordance with claim 1, wherein the generated alert is sent to the event resolution portal server, wherein the event resolution portal server comprises a graphical user interface that is configured to be used by the user to resolve one or more issues that cause the alert.

7. The system of claim 1, wherein the distributed business application is an enterprise resource planning application.

8. A system for monitoring activity of a distributed business application, the system comprising:

a condition storage storing one or more conditions, each condition comprising one or more parameters and at least one operator associated with the one or more parameters;

a condition runtime engine implemented by one or more processors that collects data associated with a state change event of the distributed business application related to at least one of the one or more parameters and retrieve at least one relevant condition;

a filter framework implemented by one or more processors to detect the state change event from the distributed business application, compare the state change with the at least one relevant condition, and generate an alert message if the state change complies with the at least one relevant condition; and a message exchange infrastructure implemented by one or more processors and adapted to receive the alert message from the filter framework, the message exchange infrastructure routing the alert message to a linked alert message consumer that is associated with an alert category of one or more alert categories that is characterized by the alert message.

9. A system in accordance with claim 8, further comprising a condition editor implemented by one or more processors and provided by an integration builder tool of a message exchange infrastructure connecting an event resolution portal server and the distributed business application, the condition editor adapted to configure the one or more parameters to define the one or more conditions.

10. A system in accordance with claim 9, wherein the condition editor includes a graphical user interface displaying a set of operators that are selectively combined with the one or more parameters by a user.

11. A system in accordance with claim 8, wherein a graphical user interface is configured to be used to resolve one or more issues associated with the generated alert message.

12. A system in accordance with claim 11, further comprising an alert server adapted to receive the alert message from the message exchange infrastructure, and send the alert message to the linked alert message consumer, the linking based on the one or more alert categories.

13. A system in accordance with claim 12, further comprising an event resolution portal server hosting an event resolution center adapted to receive the alert message and generate a resolution to the alert message based on one or more predetermined resolution activities stored in a database.

14. A system in accordance with claim 13, wherein the event resolution portal server includes a guided procedure runtime engine configured to execute a resolution scenario based on the alert message and the one or more predetermined resolution activities.

15. A method of monitoring activity of a distributed business application, the method comprising:
    gathering, using one or more processors, data from execution of the workflow of the distributed business application, the data representing one or more workflow events;
    filtering, using one or more processors, the one or more workflow events according to one or more conditions, each condition comprising one or more parameters related to the workflow event coupled with at least one operator;
    for each workflow event corresponding to a predetermined number of the one or more conditions, generating, using one or more processors, a monitoring event message for being sent to one or more monitoring processes; and
    generating, using one or more processors, an alert message for an event resolution center based on the monitoring event message, the alert message configured for receipt by the one or more monitoring processes, the alert message sent to a user linked to an alert category of a plurality of alert categories that is characterized by the alert message.

16. A method in accordance with claim 15, further comprising defining, using one or more processors, the one or more conditions in a condition editor hosted by a centralized integration builder tool, the one or more conditions comprising whether a value associated with the monitoring activity exceeds a predetermined threshold.

17. A method in accordance with claim 16, wherein the condition editor includes a graphical user interface including graphical representations of the one or more parameters and a set of operators.

18. A method in accordance with claim 16, further comprising storing the one or more conditions in a condition storage for access by a filter framework.

19. A method in accordance with claim 18, wherein the filter framework includes at least one filter for the distributed business application.

20. A method in accordance with claim 15, wherein the alert message is configured to be used by the user to resolve one or more issues associated with the alert message, the resolving being performed by using a graphical user interface.

* * * * *